United States Patent [19]

Rebold

[11] 3,945,254

[45] Mar. 23, 1976

[54] MULTIPLE SHOT PIPETTER

[75] Inventor: Jerome I. Rebold, Baltimore, Md.

[73] Assignee: Becton, Dickinson and Company, East Rutherford, N.J.

[22] Filed: Dec. 16, 1974

[21] Appl. No.: 532,877

[52] U.S. Cl. .................. 73/425.6; 128/236

[51] Int. Cl.² .................. G01N 1/14

[58] Field of Search ..... 73/425.6, 425.4 R, 425.4 P; 128/218 R, 218 A, 218 PA, 236; 285/8

[56] References Cited

UNITED STATES PATENTS

| | | | |
|---|---|---|---|
| 2,494,774 | 1/1950 | Messick | 285/8 |
| 3,160,156 | 12/1964 | Tyler | 128/236 |
| 3,290,946 | 12/1966 | Pursell | 73/425.6 |

*Primary Examiner*—S. Clement Swisher
*Assistant Examiner*—Denis E. Corr
*Attorney, Agent, or Firm*—Kane, Dalsimer, Kane, Sullivan and Kurucz

[57] ABSTRACT

A device is disclosed for receiving a disposable pipette tip, aspirating a supply of liquid into the pipette and dispensing the liquid in precise predetermined dosages. The device comprises a housing, a cylindrical passage within the housing, a piston extending into the passage from the rear end thereof and a plunger extending rearwardly from the piston. Actuating means are disposed within the housing for advancing the plunger forward in discrete amounts and a trigger extends from the housing operatively engaging the actuating means. The device further includes means for disengaging the actuating means whereby the plunger may freely be moved forward and back to permit a supply of liquid to be aspirated into the pipette. A detipping mechanism is also provided which permits a pipette tip to be removed without requiring any handling of it.

1 Claim, 17 Drawing Figures

Fig. 2
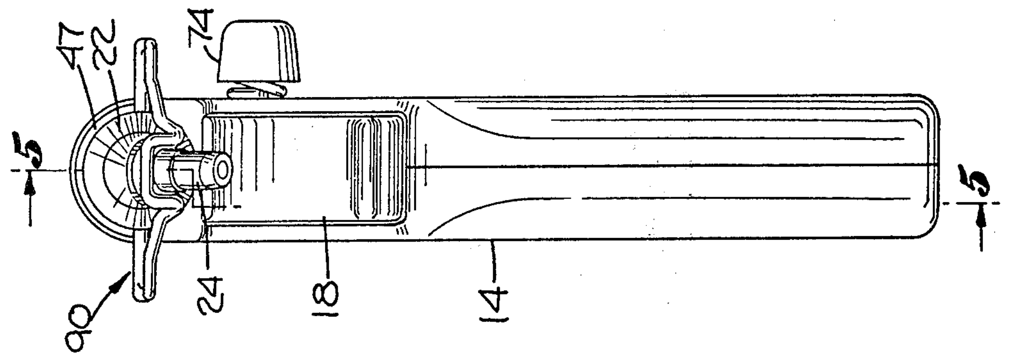
Fig. 1
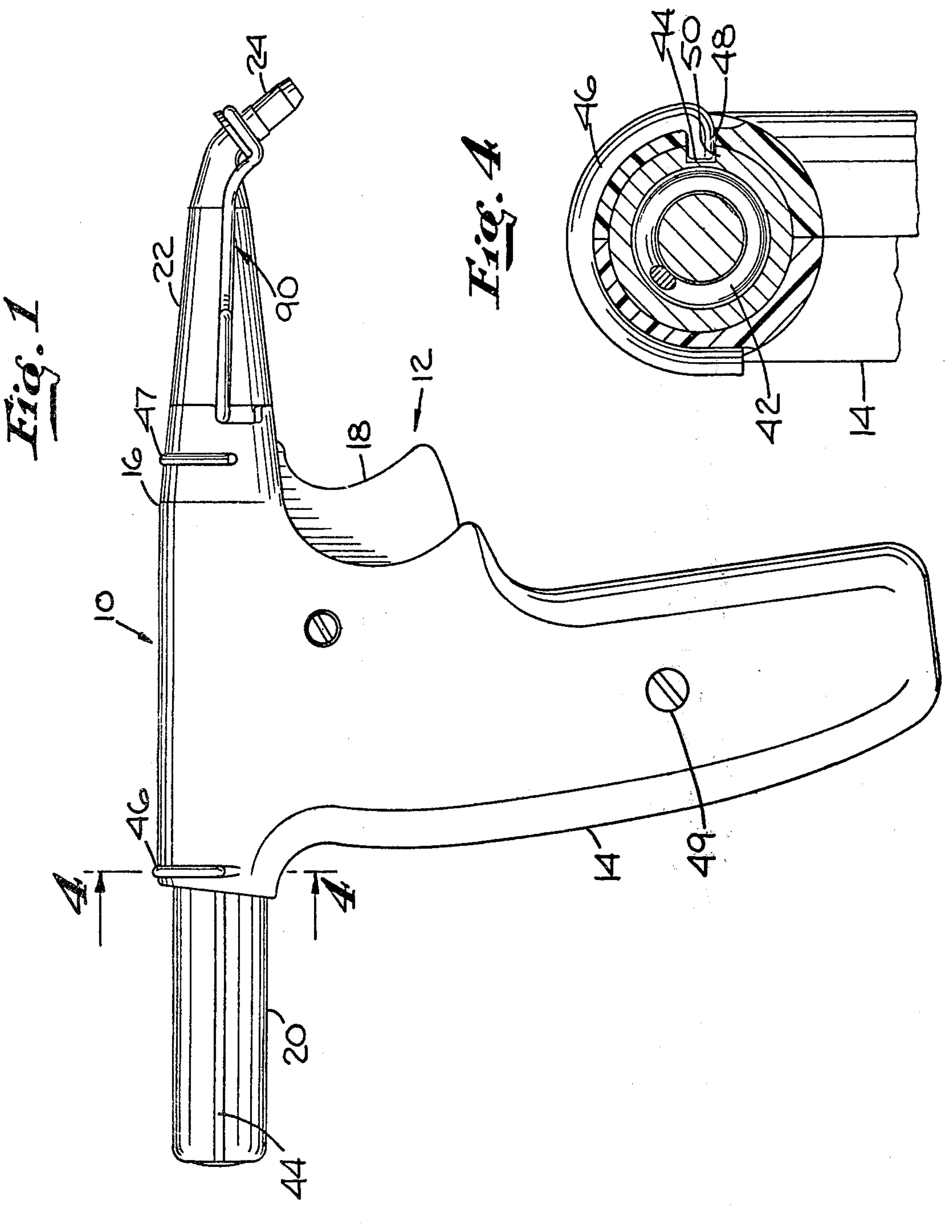
Fig. 4

MULTIPLE SHOT PIPETTER

BACKGROUND OF THE INVENTION

The present invention relates to a dispensing device and more particularly to a multi-shot pipetter capable of aspirating a quantity of liquid into a disposable pipette tip, dispensing the liquid in precise dosages, and removing the pipette tip without requiring any direct physical contact with the tip.

There are many laboratory procedures in which it is important to repeatedly pipette a precise dosage of liquid. A common procedure of this type is employed to identify the source of an infection and an antibiotic capable of fighting the infection. To this end, the infectious material is used to inoculate a growth media or culture broth whereafter precise quantities of the inoculum are reacted in accordance with a predetermined schema with various biochemicals, incubated and then examined for classical reactions, as for example, a change or lack of change of color which serves to provide desired information regarding the inoculum.

To employ the above described and similar procedures, it is essential that a precise dosage of inoculum be repeatedly reacted. In addition, it is very often essential that the various instruments that come in contact with the inoculum be maintained sterile and that the technician performing the procedure not come in direct contact with the inoculum.

In view of the above, it is a principal object of the present invention to provide a mechanical device capable of aspirating a supply of liquid into a pipette tip, dispensing predetermined aliquots of the liquid as required and thereafter ejecting the tip without requiring any handling of the tip.

SUMMARY OF THE INVENTION

The above and other beneficial objects and advantages are attained in accordance with the present invention by providing a device for receiving a pipette tip and aspirating a supply of liquid into the pipette and dispensing the same in precise predetermined dosages. The device comprises a housing, a cylindrical passage within the housing, a piston extending into the passage from the rear end thereof and a plunger extending rearwardly from the piston. Actuating means are disposed within the housing for advancing the plunger forward in discrete amounts and a trigger extends from the housing operatively engaging the actuating means. The device further includes means for disengaging the actuating means whereby the plunger may freely be moved back and forth to permit a supply of liquid to be aspirated into the tip. A detipping mechanism is also provided which permits a pipette tip to be removed without requiring any handling of it.

BRIEF DESCRIPTION OF THE DRAWINGS

In the accompanying drawings:

FIG. 1 is a side elevational view of a device in accordance with the present invention;

FIG. 2 is a front elevational view of the device of FIG. 1;

FIG. 4 is a sectional view taken along reference lines 4—4 of FIG. 1;

DETAILED DESCRIPTION OF THE PREFERRED EMBODIMENT

Figures 3, 7:
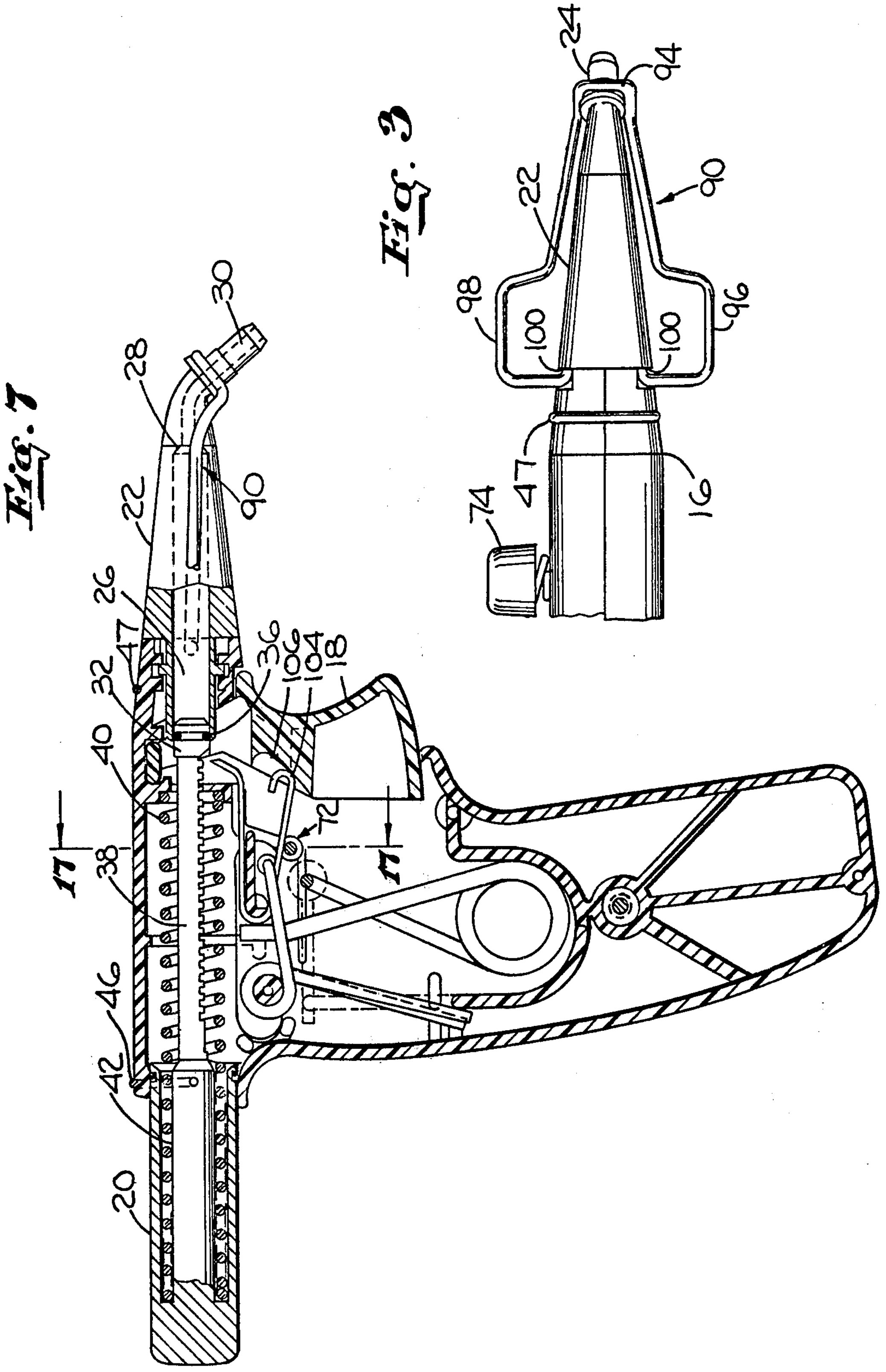
FIG. 3 is a fragmentary top plan view of the forward section of the device of FIG. 1.
FIG. 7 is a side elevational sectional view of the present device.

Reference is now made to the drawings wherein similar components bear the same reference numeral throughout the several views. In FIG. 1, a device 10 for aspirating a quantity of liquid into a pipette in accordance with the present invention is shown. Device 10 comprises a housing generally designated by the number 12 having a handle portion 14, barrel 16, trigger 18 and plunger 20. The forward portion 22 of the barrel 16 tapers to a nozzle 24 defining the front end of the housing. THe housing is formed of any suitable material such as plastic and the forward portion 22, which is removable, is formed of stainless steel to facilitate autoclaving in the event contaminated material inadvertently comes into contact with it.

Figure 11:
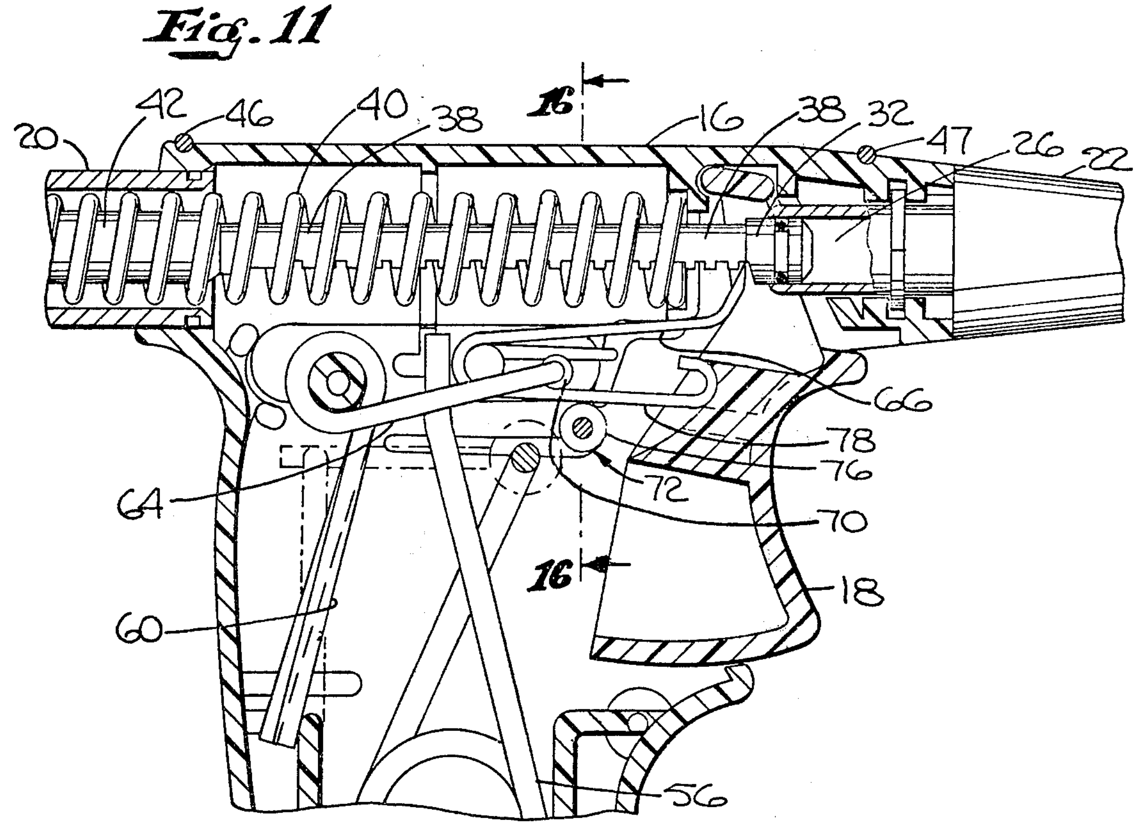
FIG. 11 is a fragmentary side elevational sectional view of the device in position for dispensing the aspirated liquid prior to depressing the trigger.
Figure 12:
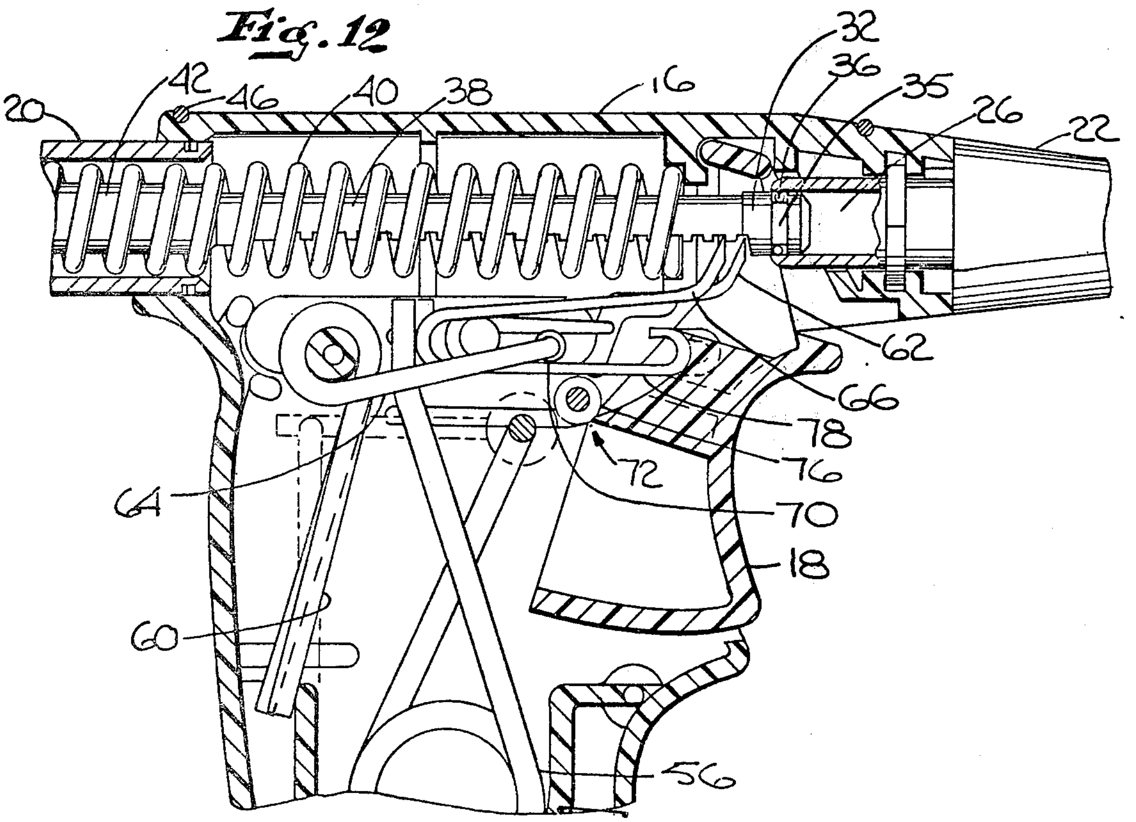
FIG. 12 is a view identical with FIG. 11 depicted after the trigger is depressed.
Figure 13:
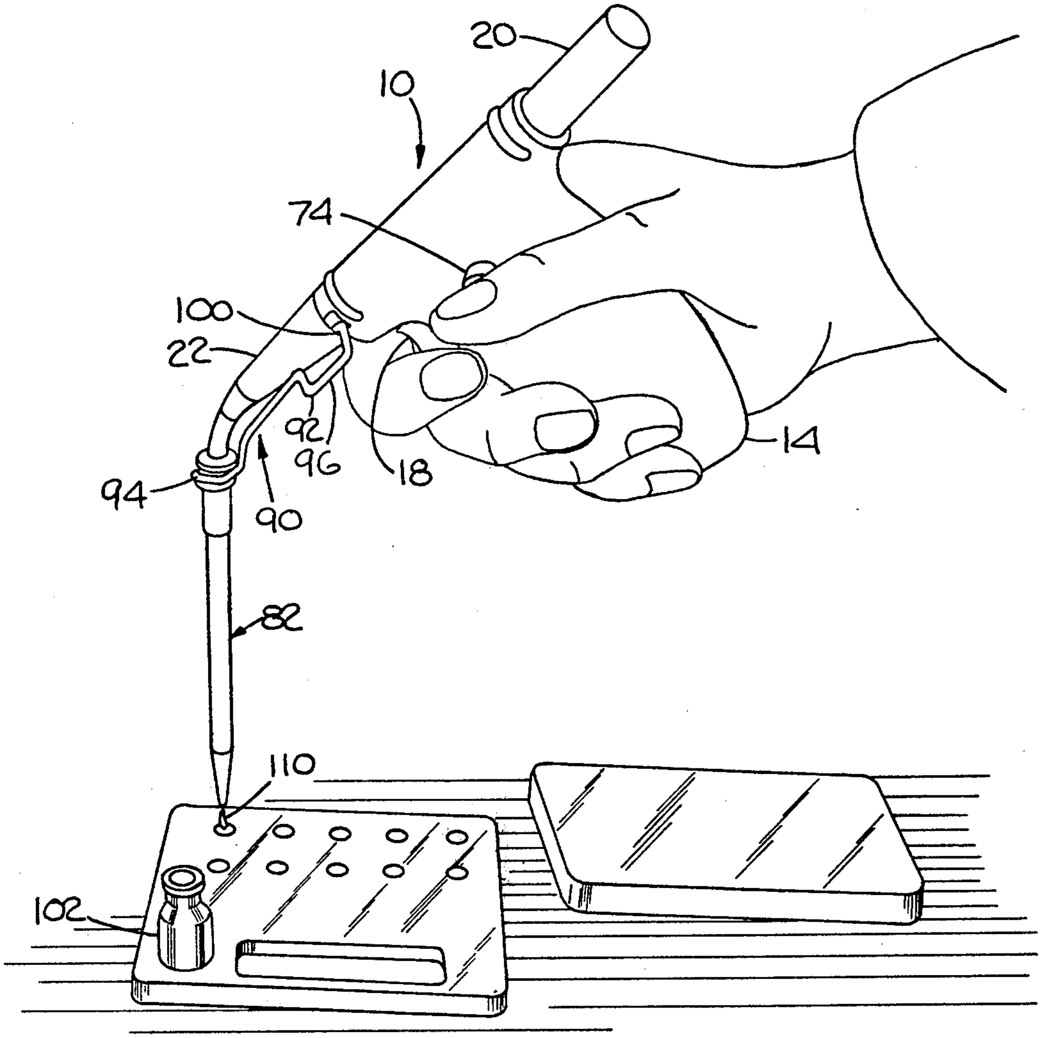
FIG. 13 is an environmental view depicting the dispensing operation.

Referring to FIG. 7, it can be seen that a cylindrical passage 26 extends through the front portion of the housing. The frong end 28 of passage 26 communicates with an opening 30 extending through the nozzle. A piston 32 extends into the cylindrical passage 26 from the rear end 34 thereof. Referring briefly to FIGS. 11 and 12, it can be seen that the piston is provided with a circumferential groove 35 about which an O-ring 36 formed of a suitable rubber is provided to insure a firm seal between the piston and cylinder walls. A ratchet 38 extends rearwardly from the rear of the piston. The ratchet terminates in plunger 20 which extends through a suitable opening in the rear of the housing. It should be apparent, when the plunger is pushed forward the piston enters the cylindrical passage driving all air in front of it out the nozzle opening. Conversely, when the plunger moves rearwardly and the piston retracts from the cylindrical passage, a vacuum is created sucking air into the cylindrical passage. The plunger and ratchet are formed of a suitable stainless steel.

A spring 40 positioned within the barrel and extending into a recess 42 is biased to urge the plunger rearwardly. A longitudinal groove 44 extends along the plunger. A spring clip 46 wrapped around the top of the housing has an inwardly directed projection 48 which rides in the groove. A ring 50 disposed about the forward end of the plunger prevents the plunger from being totally expelled out the rear of the housing by engaging the projection 48.

Figure 6:
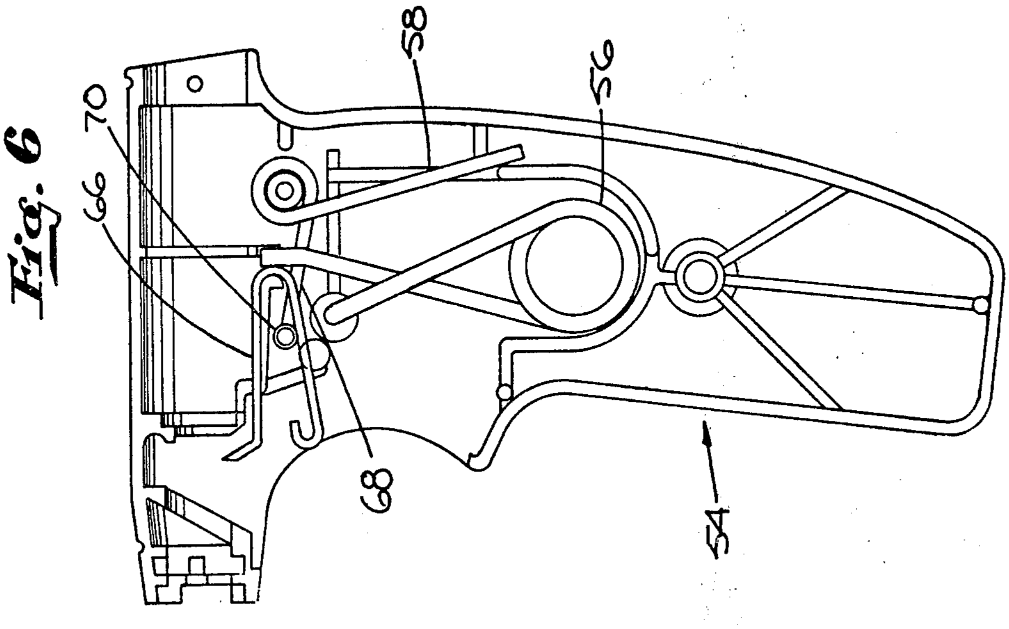
FIG. 6 is a side elevational view similar to FIG. 5 depicting the other half of the housing.
Figure 5:
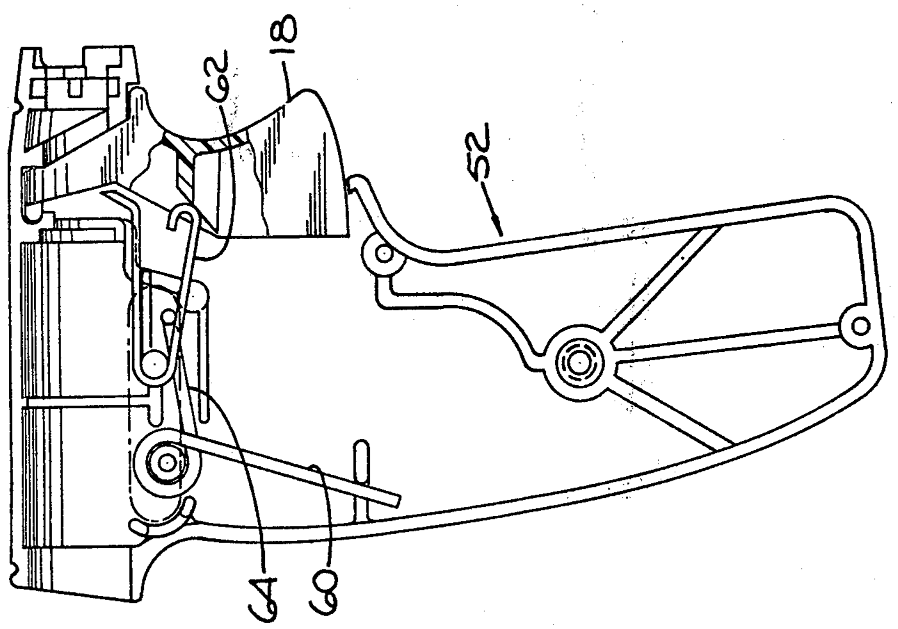
FIG. 5 is a side elevational view partly in section depicting one-half of the housing assembly of the present device.
Figure 16:
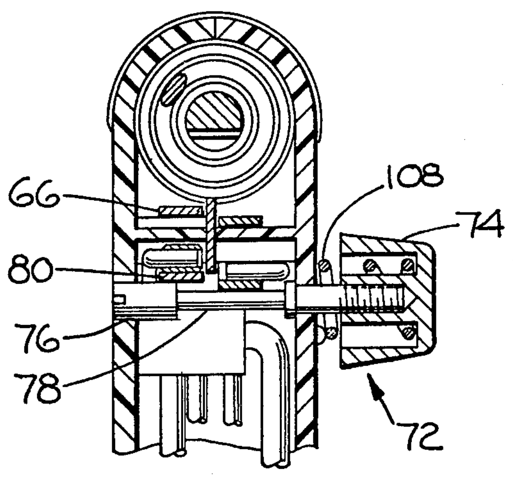
FIG. 16 is a sectional view taken along reference lines 16—16 of FIG. 11.

Referring to FIGS. 5 and 6, it can be seen that the major portion of the housing is formed of two complementary halves 52 and 54. The halves of the housing are held together by spring clip 46, spring clip 47 (at the forward end of the barrel) and screw 49 which passes through the halves to the handle. The actuating mechanism for the plunger is disposed within these halves and comprises a mainspring 56, a spring feed 58 and a back stop spring 60, each positioned as shown. Housing half 52 further contains a stationary pawl 62 interlocked in position by arm 64 of spring 60. A moving pawl 66 contained within housing half 54 is engaged by the leg 68 of spring 58. A roller 70 is positioned over the leg 68. As will be described forthwith, the stationary and moving pawls cooperate with the ratchet 38 to advance the plunger 20 each time trigger 18 is depressed. To this end, referring to FIG. 11, it can be seen that in the normal operating position, the pawl 66 serves to engage the teeth of ratchet 38 thereby preventing the spring 40 from driving the plunger rearwardly. When the trigger is depressed, the stationary pawl 62 is raised as shown in FIG. 12 to engage the ratchet. Further pressing of the trigger draws the moving pawl 66 rearwardly to engage the next rearwardmost tooth and drive the plunger forward a distance between adjacent teeth. Thereafter, the stationary pawl returns to its normal position. Thus, repeated pressing and releasing of the trigger causes the plunger to advance in discrete steps each step comprising the distance between adjacent teeth. An important feature of the present invention is the safety pin assembly 72 which extends through the handle and terminates in a knob 74 on the outside of the device. The safety pin has an enlarged shoulder 76 and a narrow shoulder 78. As shown in FIGS. 11, 12 and 16, when the safety pin assembly is in its normal position, the enlarged shoulder 76 is positioned beneath the bottom extension 80 of pawl 66 thereby holding the pawl up to engage the ratchet. In this way, the ratchet is prevented from disengaging with the pawl.

Figure 17:
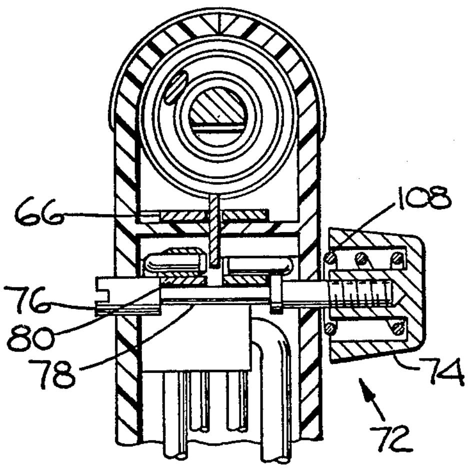
FIG. 17 is a sectional view taken along reference lines 17—17 of FIG. 14.

When the safety pin is shifted inwardly so that the pawl extension 80 engages the narrow portion 78 of the pin (as shown in FIGS. 7 and 17) spring 58 urges the moving pawl downwardly to disengage from the ratchet (as shown in FIG. 7) to permit free back and forth movement of the plunger. Thus, with the pin out (as shown in FIG. 16), the plunger can advance incrementally each time the trigger is pressed. With the pin in, (as shown in FIG. 17), the piston can rapidly be drawn forward or backward by depressing and releasing the plunger.

As stated previously, the present device is designed for use with a disposable pipette tip 82 which fits over the nozzle 24. The rear end 84 of pipette 82 is dimensioned to fit snugly about the nozzle tip. To this end, the nozzle tip includes a step 86 which tightly engages the interior walls of the pipette. To further insure a tight fit between the pipette and nozzle, the pipette 82 is preferably formed of a relatively soft plastic material whereas the nozzle tip is formed of stainless steel or the like.

Figure 14:
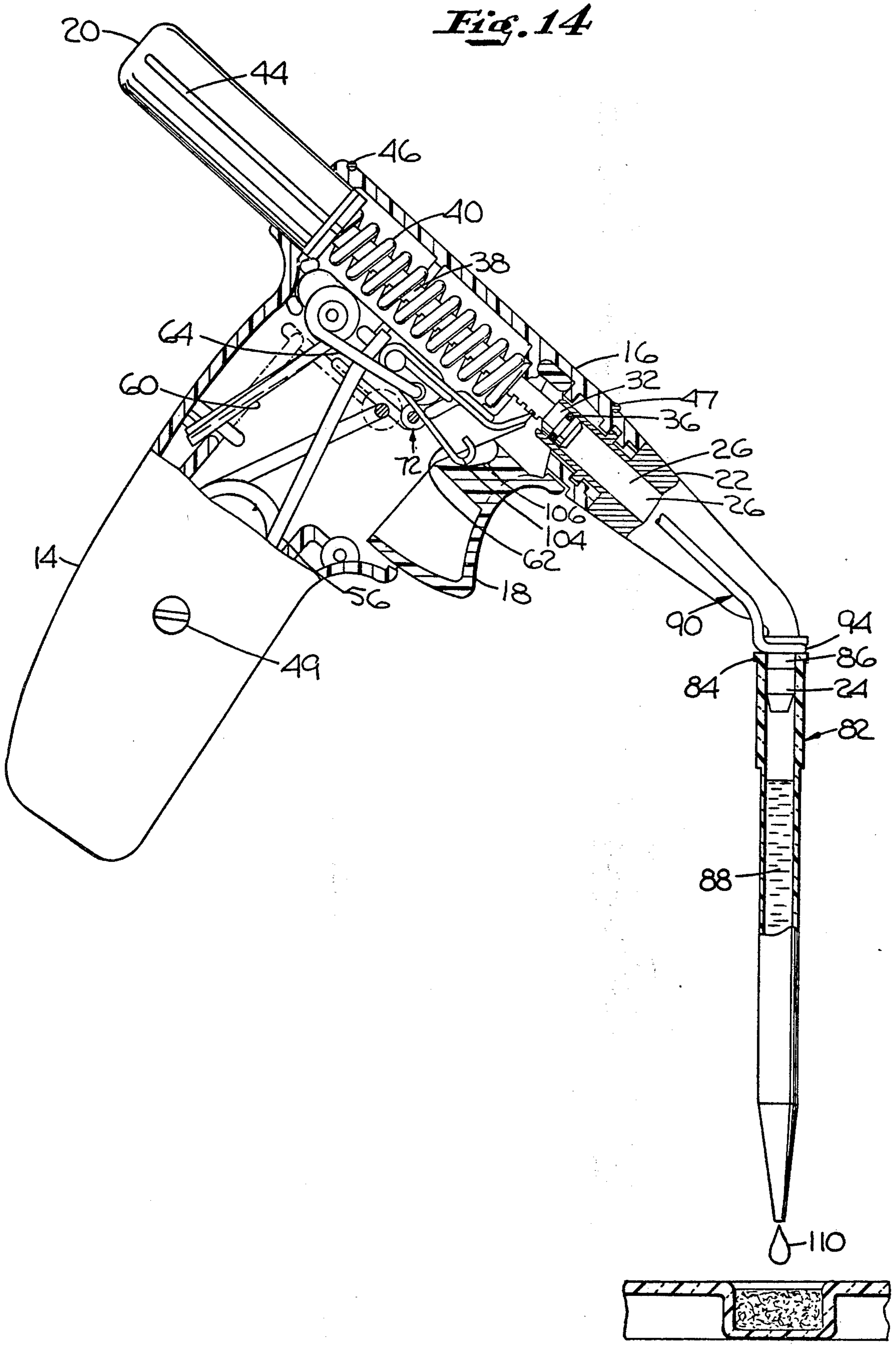
FIG. 14 is a side elevational view partly in section of the present device and an associated pipette during the dispensing operation.
Figure 15:
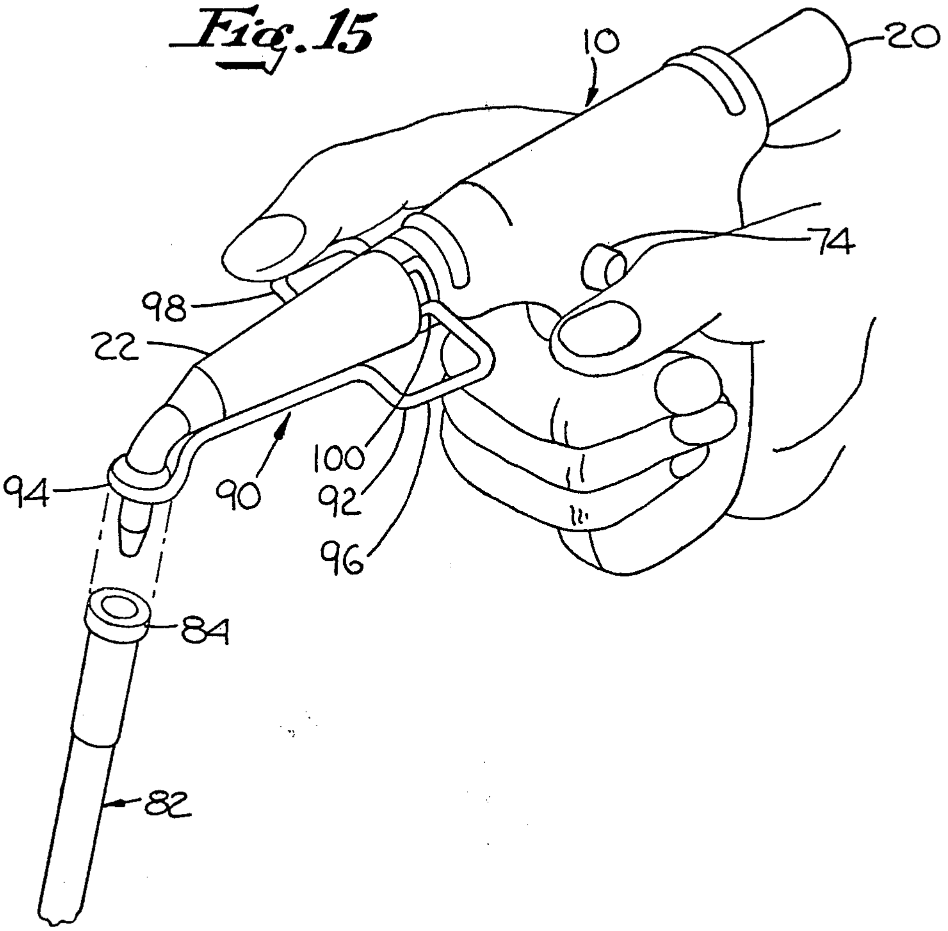
FIG. 15 is an environmental view depicting the ejection of an associated pipette.

The volume within the pipette bore is greater than that of the cylindrical passage 26 so that when the pipette is placed in a liquid and the piston advanced and retracted, the quantity of liquid 88 drawn into the pipette is maintained at a safe distance below the front end of the pipette as shown in FIG. 14.

Another important feature of the present invention is the ejector arrangement 90 provided to automatically remove pipettes from the housing when desired. Ejector 90 comprises a wire 92 extending about the forward portion of the housing and having a loop 94 immediately behind the nozzle step 86. The wire is formed with a pair of wings 96 and 98 on opposite sides of the housing with each wing terminating in a post 100 extending into a suitable opening in the housing front end. When either of the wings is pushed upwardly or downwardly, the loop 94 moves eccentrically forward thereby urging the pipette off the nozzle step 86 and enabling it to fall freely of the assembly.

Figure 8:
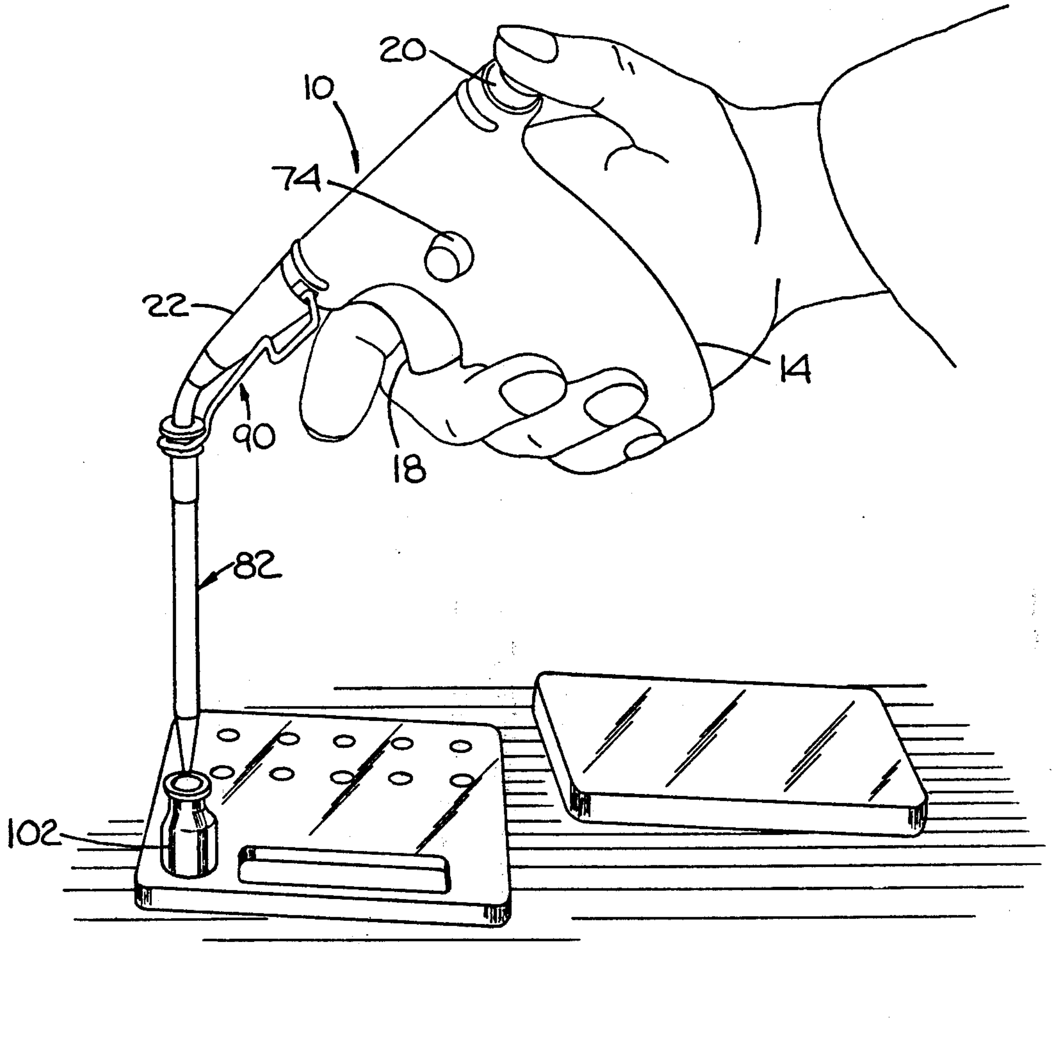
FIG. 8 is an environmental view depicting how the present device is used to aspirate a supply of liquid into a pipette.
Figure 9:
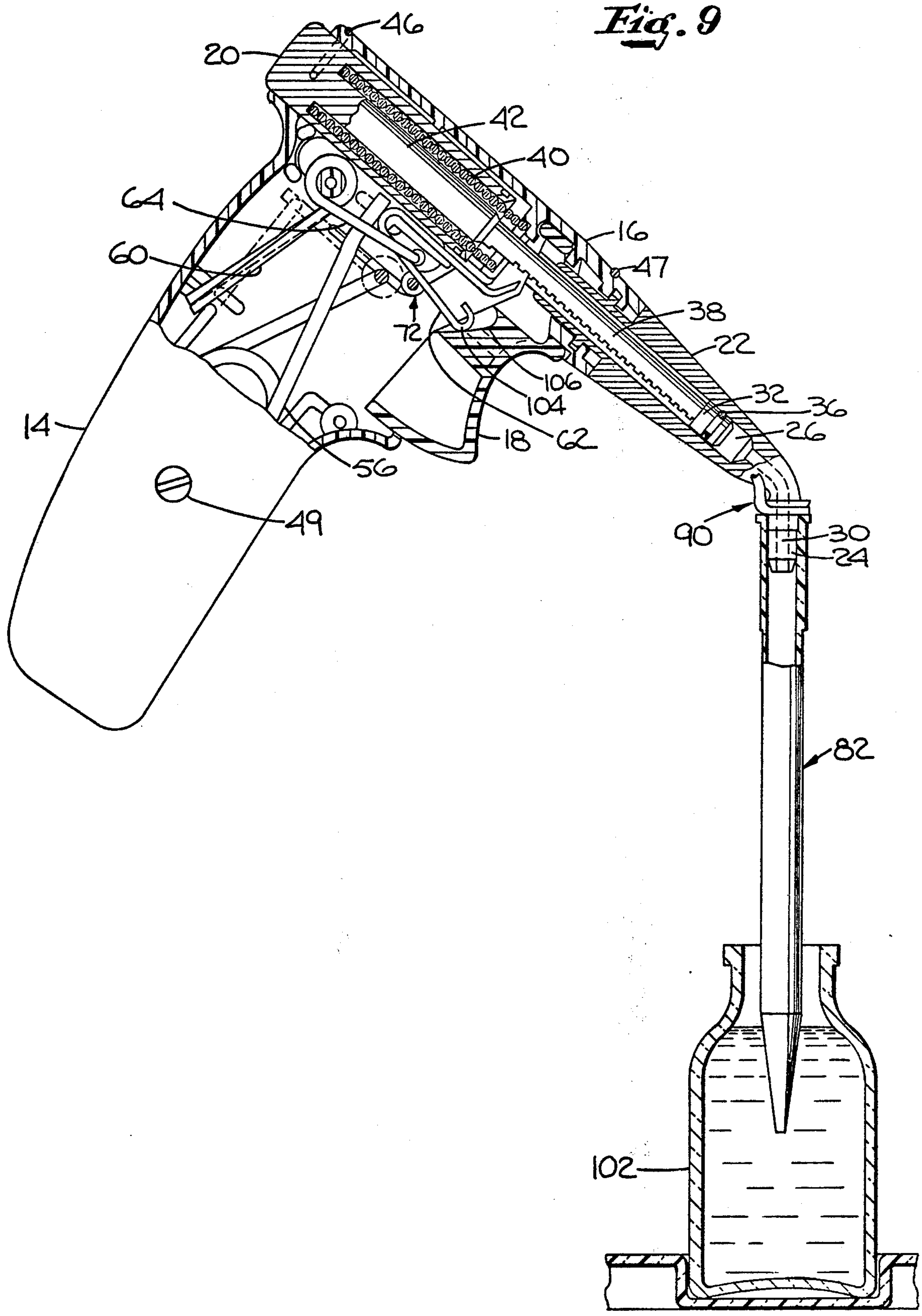
FIGS. 9 and 10 are side elevational views partly in section depicting the device during the filling operation.
Figure 10:
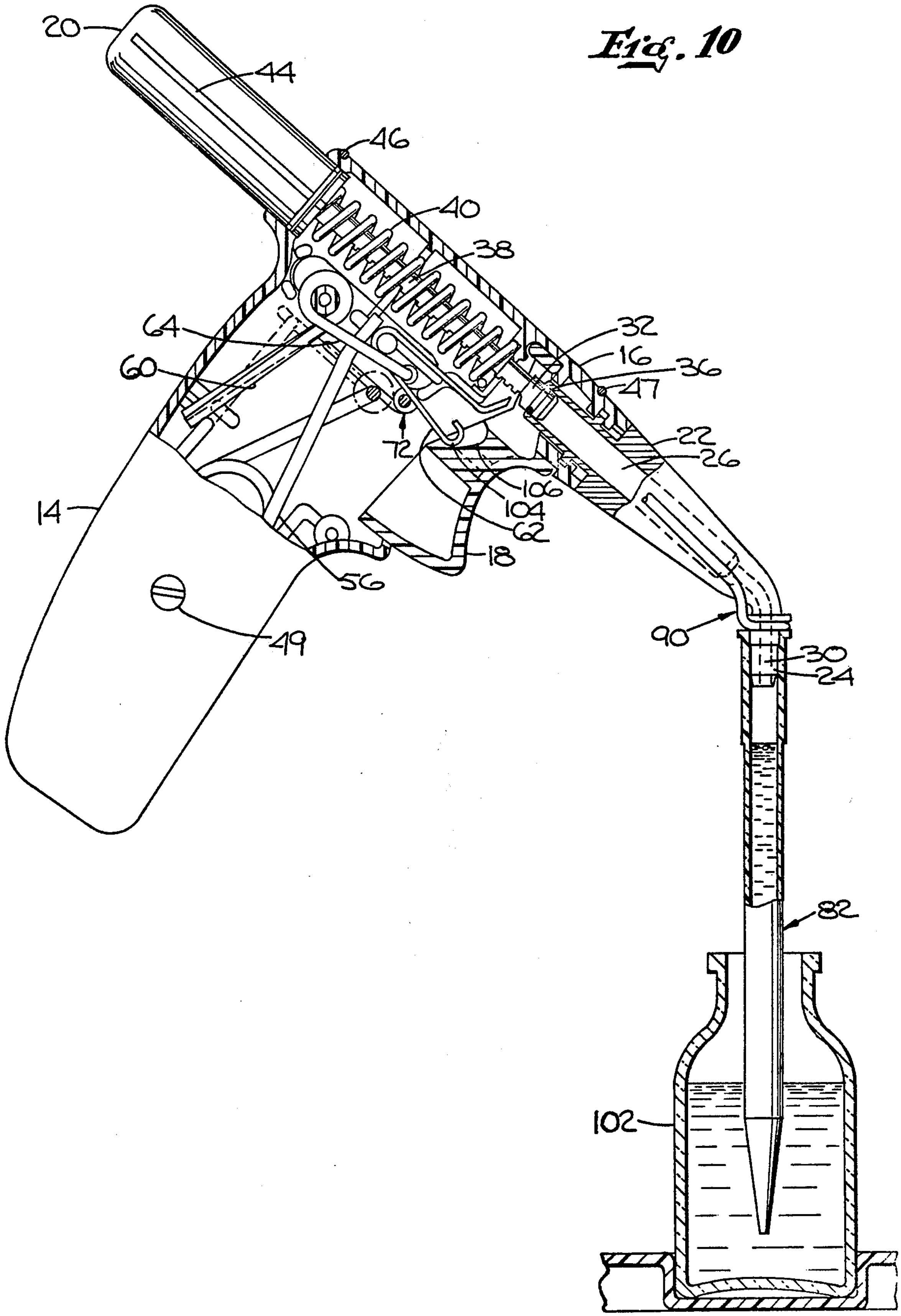

The operation and use of the present invention may best be understood with reference to the various environmental views. Thus, a pipette 82 is first applied to the nozzle and the safety button 74 is pushed in (to assume the position shown in FIG. 17). This disengages the pawls from the ratchet so that the operator, by pushing the plunger 20 all the way in with his thumb (as shown in FIG. 8), and then slowly releasing the plunger, can aspirate a quantity of liquid from associated vial 102. As stated, the volume displaced by the piston 32 within cylindrical cylinder 26 is less than that of the pipette so that the total fluid drawn into the pipette reaches a level below that of the nozzle (as shown in FIG. 10).

The operator then presses the trigger once. By squeezing the trigger, the forward end 104 of the pawl rides along the cam surface 106 of the trigger and is raised off the narrow portion of the safety pin thereby enabling the safety pin spring 108 to drive the safety pin out (to the position shown in FIG. 16). Thereafter, the pawl is held in a raised position by the enlarged shoulder 76 of the safety pin so that the pawl remains engaged with the ratchet assembly. The operator then squeezes the trigger to dispense a precise quantity 110 of the liquid from the pipette by virtue of the air within the cylindrical passage bearing down on the fluid column within the pipette. When the operator is through, he ejects the pipette by rotating the ejector wire. If, for any reason, the operator wishes to quickly dispense all of the liquid within the pipette, he need merely depress the safety button which will disengage the ratchet and pawl mechanism and then press the plunger in.

Thus, in accordance with the above, the aforementioned objects are effectively attained.

Having thus described the invention, what is claimed is:

1. A device for aspirating a supply of liquid into a pipette and dispensing the same in precise predetermined dosages, said device comprising: a housing; a cylindrical passage within said housing, said passage having an open front end and an open rear end; a piston extending into said passage from said rear end; a plunger extending rearwardly from said piston; means on said housing for securing a pipette to said housing in communication with said passage front end; first spring means within said housing biased to urge said piston toward said rear end; a trigger extending from said housing; actuating means disposed within said housing for advancing said plunger forward a discrete amount each time said trigger is pressed and released; an outlet nozzle attached to said housing; an opening through said nozzle in communication with said housing front end; means on said nozzle for securing a pipette in position about said nozzle; and means on said housing for urging said pipette off said nozzle securing means, said pipette urging means comprising a member eccentrically mounted about said nozzle, said member having a portion disposed about said pipette securing means whereby rotation of said member causes said portion to move forwardly to urge said pipette off said nozzle securing means.

* * * * *